US008723036B2

(12) United States Patent
Heebner

(10) Patent No.: US 8,723,036 B2
(45) Date of Patent: May 13, 2014

(54) MODEM WALL ATTACHMENT BRACKET AND METHOD

(76) Inventor: Barry P. Heebner, Calgary (CA)

(*) Notice: Subject to any disclaimer, the term of this patent is extended or adjusted under 35 U.S.C. 154(b) by 268 days.

(21) Appl. No.: 12/586,165

(22) Filed: Sep. 18, 2009

(65) Prior Publication Data

US 2011/0070772 A1   Mar. 24, 2011

(51) Int. Cl.
*H01R 13/66* (2006.01)
*H02G 3/14* (2006.01)

(52) U.S. Cl.
USPC .......................................... 174/67; 439/527

(58) Field of Classification Search
CPC ........ H01R 25/006; H01R 33/05; H02G 3/14; H02G 3/16; H02G 3/081; H02G 3/10; H02G 3/12
USPC .............................................. 439/527; 174/67
See application file for complete search history.

(56) References Cited

U.S. PATENT DOCUMENTS

| | | | | |
|---|---|---|---|---|
| 2,392,445 | A * | 1/1946 | Anderson | 439/527 |
| 2,438,143 | A * | 3/1948 | Brown | 191/12 R |
| 2,874,531 | A * | 2/1959 | Cattell | 368/88 |
| 3,113,996 | A * | 12/1963 | Sanford | 174/67 |
| 3,132,230 | A * | 5/1964 | Laug | 392/352 |
| 4,484,033 | A * | 11/1984 | Licari | 379/447 |
| 4,852,151 | A * | 7/1989 | Dittakavi et al. | 379/93.35 |
| 5,011,427 | A * | 4/1991 | Martin | 439/373 |
| 5,013,260 | A * | 5/1991 | Caveney et al. | 439/535 |
| 5,334,052 | A * | 8/1994 | Chen | 439/650 |
| 5,539,821 | A * | 7/1996 | Blonder | 379/446 |
| 5,727,745 | A * | 3/1998 | Vara | 242/400.1 |
| 6,048,215 | A * | 4/2000 | Tateishi | 439/102 |
| 6,427,606 | B1 * | 8/2002 | Klotz | 108/42 |
| 6,642,450 | B1 * | 11/2003 | Hsiao | 174/53 |
| 6,969,275 | B1 * | 11/2005 | Brock | 439/502 |
| 7,067,737 | B2 * | 6/2006 | Mallen | 174/66 |
| 2004/0035972 | A1 * | 2/2004 | Glass | 242/388.6 |
| 2007/0215054 | A1 * | 9/2007 | Reusche et al. | 119/28.5 |
| 2007/0227755 | A1 * | 10/2007 | Wu et al. | 174/67 |
| 2009/0142947 | A1 * | 6/2009 | Byrne | 439/131 |
| 2009/0163073 | A1 * | 6/2009 | Liao | 439/527 |
| 2009/0314921 | A1 * | 12/2009 | Gould | 248/636 |

* cited by examiner

*Primary Examiner* — Jeremy C Norris
*Assistant Examiner* — Nathan Milakovich
(74) *Attorney, Agent, or Firm* — G. F. Gallinger

(57) ABSTRACT

A wall mounting bracket to carry a modem adjacent to two 120 VAC outlet wall receptacles on the face of a wall, said bracket secured to the wall beneath a six outlet plug adaptor when the adaptor is plugged into the receptacles, comprising: a generally planar member having, a) a wall outlet attachment side portion which has a border portion which surrounds the six outlet plug adaptor when it is plugged into the receptacle to thereby prevent rotation with respect to the adaptor, and a flange means which extends inwardly from the border portion beneath the plug adaptor to thereby maintain the bracket adjacent to the wall, and a receptacle access opening positioned centrally within the border portion to permit electrical access to the receptacles; and, b) an adjacent modem attachment side portion which extends from the border portion, along the wall so that the modem can be carried thereby.

13 Claims, 1 Drawing Sheet

MODEM WALL ATTACHMENT BRACKET AND METHOD

FIELD OF THE INVENTION

This invention relates to the use and positioning of cable modems, cable-voice modems and telephone line/internet modems, on a wall, in a finished living area. More particularly this invention relates to a modem carrying bracket, which attaches to a wall around a power outlet, without making new screw holes in the wall. The modem and wires associated therewith are then conveniently positioned above and off the floor.

BACKGROUND OF THE INVENTION

Cable and telephone companies are now required by communication regulatory agencies to mount telephone/internet equipment on the wall when installation thereof is in a finished living area such as an apartment. This equipment typically is powered by a 120 VAC powered adaptor. Accordingly, a logical place to position a modem on the wall is immediately adjacent to the wall power outlet by which it is powered. Most frequently a power outlet which is in close proximity to a cable wall outlet and/or a telephone wall jack is selected to power the telephone/internet equipment. When a telephone wall jack is in close proximity a telephone line wire extending from the modem to the telephone wall jack can be utilised to extend the telephone connection to all jacks in the finished living area or apartment.

Within this specification a modem is intended, and defined to include, but is not intended to be limited to, a cable modem having an input cable and an outlet internet cable port, a cable-voice modem having an input cable and both an internet cable port and telephone line ports, a telephone modem which has a telephone line input and an outlet internet port, and even a router.

Apartment dwellers are typically tenants which move frequently. They prefer not to make holes in the wall which will reduce the amount which will be refunded from their damage deposit. There is a need for a convenient wall modem attachment bracket which is both convenient to both install and remove, as well as flexible enough to facilitate its use in situations wherein the modem must be positioned, to the left, right, above or below the wall outlet, as determined by available space adjacent to the particular wall power outlet. It is critical that the internet, and particularly the telephone connection stay connected. When the devices and wires are lifted off the floor, the wires are less likely to be caught by a vacuum or a person's foot, or even by a child. When the devices are securely attached to a power outlet, even if they are bumped, they are much less likely to be torn off the wall, than if attached by screws inserted into the drywall.

OBJECTS OF THE INVENTION

It is an object of this invention to disclose a modem mounting bracket which carries a modem and its accompanying wires on a wall above and off the floor. This then enables the floor to be more conveniently vacuumed, and minimizes the tripping hazard of the wires. It is an object of this invention to disclose a modem wall mounting bracket which is carried between a six port power adapter and a wall power outlet, so that the wall mounting bracket may be attached to the wall with maximal convenience and simplicity. When attaching the bracket to an exterior concrete wall it is particularly convenient not to have to drill holes into the concrete. And additionally, it is particularly convenient to be able to remove the bracket quickly without leaving any screw holes, or patching and painting over the screw holes, in the wall. It is yet a further object of this invention to disclose a wall modem attachment bracket which is both convenient and flexible enough to facilitate its use in situations wherein the modem must be positioned, to the left, right, above or below the wall outlet, as determined by available space adjacent to the particular wall power outlet. It is a final object of this invention to disclose a modem attachment bracket adapted to carry a cover so that the wires and dark components under the cover are aesthetically covered.

One aspect of this invention provides for a wall mounting bracket to carry a modem adjacent to two 120 VAC outlet wall receptacles on the face of a wall, said bracket secured to the wall beneath a six outlet plug adaptor when the adaptor is plugged into the receptacles, comprising: a generally planar member having, a) a wall outlet attachment side portion which has a border portion which surrounds the six outlet plug adaptor when it is plugged into the receptacle to thereby prevent rotation with respect to the adaptor, and a flange means which extends inwardly from the border portion beneath the plug adaptor to thereby maintain the bracket adjacent to the wall, and a receptacle access opening positioned centrally within the border portion to permit electrical access to the receptacles; and, b) an adjacent modem attachment side portion which extends from the border portion, along the wall so that the modem can be carried thereby.

A method of attaching a modem to a wall comprises the steps of: a) providing a wall mounting bracket as specified above; b) positioning the receptacle access opening in the wall bracket directly over a wall receptacle; c) plugging the six outlet adaptor through the access opening into the wall receptacle thereby securing the bracket in position over and adjacent to the wall receptacle; d) partially screwing screws into the pair of pilot holes provided on a top portion of the modem side portion of the bracket; and then, e) slidingly hanging the modem on the heads of the screws.

Various other objects, advantages and features of this invention will become apparent to those skilled in the art from the following description in conjunction with the accompanying drawings.

FIGURES OF THE INVENTION

Figure 1:
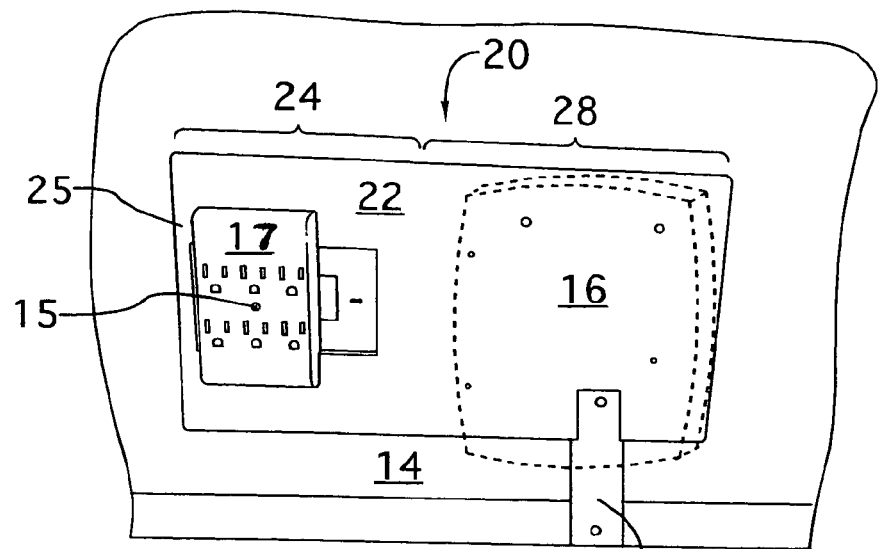
FIG. 1 is a perspective view of a modem wall attachment bracket positioned over and around a wall outlet receptacles, and beneath a six outlet adapter.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Figure 2:
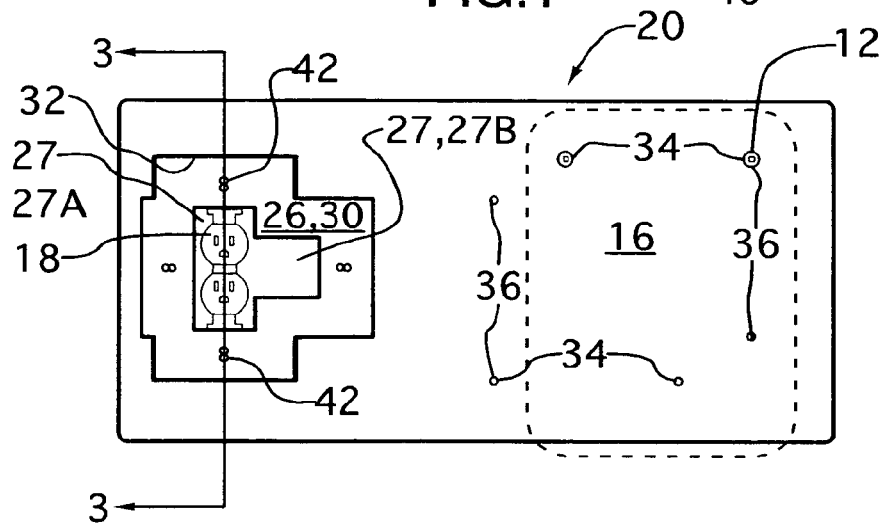
FIG. 2 is a plan view of the modem wall bracket shown in FIG. 1. The six outlet adapter has been removed and the wall outlet receptacles are shown in a vertical rectangle beneath the wall attachment bracket.

Turning now to the drawings and more particularly to FIG. 1 we have a perspective view of a modem wall attachment bracket 20 positioned over and around a wall outlet receptacle 18, and beneath a six outlet adapter 17. FIG. 2 is a plan view of the modem wall bracket 20 shown in FIG. 1. The six outlet adapter 17 has been removed and the wall outlet receptacles 18 are shown in a vertical rectangle beneath the wall attachment bracket 20. Most generally a wall mounting bracket 20 to carry a modem 16 adjacent to two 120 VAC wall outlet receptacles 18 on the face of a wall 14, said bracket 20 secured to the wall 14 beneath a six outlet plug adaptor 17 when the adaptor 17 is plugged into the receptacles 18, comprises: a generally planar member 22 having, a) a wall outlet attachment side portion 24 which has a border portion 25 which surrounds the six outlet plug adaptor 17 when it is plugged into the receptacles 18 to thereby prevent rotation with respect to the adaptor 17, and a flange means 26 which extends inwardly from the border portion 25 beneath the plug adaptor 17 to thereby maintain the bracket 20 adjacent to the wall 14, and a receptacle access opening 27 positioned centrally within the border portion 25 to permit electrical access to the receptacles 18; and, b) an adjacent modem attachment side portion 28 which extends laterally from the border portion 25, along the wall 14 so that the modem 16 can be carried thereby.

Most preferably the wall attachment bracket 20 is fabricated from a generally rectangular sheet having a) a wall side portion 20A, which is immediately adjacent to the wall 14, and which comprises the flange means 26 which most preferably is a continuous flange 30 having a minimal depth so that it can extend beneath the six outlet adaptor 17 when it is plugged into the receptacles 18, said continuous flange 30 surrounding a first opening 27A which permits electrical access to the receptacles 18, and b) a front side portion 20B having a larger, generally rectangular, opening 32 therethrough dimensioned to closely surround the six outlet adaptor 17 when it is plugged into the receptacles 18, to thereby prevent rotation of the attachment bracket 20 with respect to the adaptor 17.

Most preferably the modem 16 is of the type having inverted keyhole slots (not shown) on a rear top side portion thereof to permit hanging carriage on the head of a screw 12. The screw 12 is slidingly received in the keyhole slots. A top side portion of the modem attachment side portion 28 of the bracket is provided with two pilot holes 34 appropriately spaced, so that after screws 12 are partially turned therein, the heads of the screws 12 are received within the round portion of the keyhole slot, and the modem 16 may slide down therein, securing attachment on the bracket 20. A lower side portion of the modem attachment side portion of the bracket 20 is provided with two additional pilot holes 34 appropriately spaced so that when the bracket 20 is rotated 180 degrees about the receptacles 18, and the modem attachment side portion 28 of the bracket 20 is on the opposite lateral side of the receptacle 18, after screws 12 are partially turned into the two additional holes 34, a top side portion of the modem 16 can hang from screws 12 in the two additional holes 34. The six outlet adaptor 17 may be used with or without the central security screw 15 provided to ensure locking attachment to the wall receptacle 18.

The first opening 27A through the wall mounting bracket 20 to permit electrical access to the receptacles 18 is generally rectangular, and the bracket 20 most preferably further comprises a second generally rectangular electrical access opening 27B rotated 90 degrees from the first rectangular access opening 27A so that the receptacles 18 may be accessed when the bracket 20 is rotated 90 degrees either clockwise, or counter clockwise to thereby position the modem attachment side portion 28 of the bracket 20 respectively, either below or above the wall receptacles 18, as determined by available space adjacent to the particular wall receptacles 18.

The modem attachment side portion 28 of the bracket 20 is provided with yet two more pairs of appropriately spaced pilot holes 36, one pair adjacent to the wall receptacles 18 for hanging the modem 16 beneath the wall receptacles 18 and the other pair 36 along the side of the modem attachment side portion 28 furthest from the wall receptacles 18 for hanging the modem 16 above the wall receptacle when the modem attachment side portion 28 of the bracket 20 is on the opposite lateral side of the receptacle 18, after screws 12 are partially turned into the two additional holes 36, a top side portion of the modem 16 can hang from screws 12 in the two additional holes 36.

In a preferred embodiment of the invention the wall mounting bracket 20 further comprises a telescoping leg 40 having an upper end portion attached to the bracket 20 and a lower portion which can be extended downwardly to the floor to thereby prevent the modem attachment bracket 20 from twisting under the sustained weight of the modem 16.

If the wall mounting bracket 20 further comprises pairs of vertically aligned small holes 42 positioned above and below the rectangular openings 27 in the wall side portion 24 to permit of the screwed attachment of the wall attachment bracket 20 to a DECORA™ type (not shown) wall receptacle 18; only the upper hole in the pair 42 above the wall receptacle 18 and the upper hole in the pair 42 beneath the wall receptacle 18 are used; the other unused holes in the pairs 42 are provided for use when the bracket 20 is rotated 180 degrees.

Figure 3:
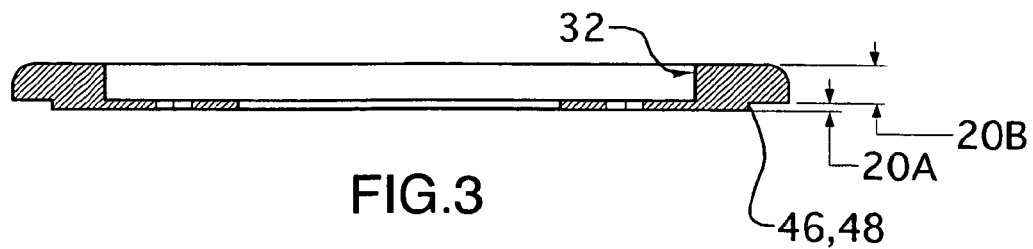
FIG. 3 is a cross sectional view as viewed along line 3-3 shown in FIG. 2.

Most preferably the wall mounting bracket 20 further comprises mounting bracket cover attachment means 46 to facilitate holding a cover which covers the wall attachment bracket, a modem attached thereto, as well as accompanying wires, to enhance aesthetic appearance. As shown in FIG. 3 the mounting bracket cover attachment means 46 most preferably comprises a peripheral groove 48 extending around the wall attachment bracket 20.

A method of attaching a modem 16 to the wall 14 comprises the steps of: a) providing a wall mounting bracket 20 as most generally described above; b) positioning the receptacle access opening 27 in the wall bracket 20 directly over a wall receptacle 18; c) plugging the six outlet adaptor 17 through the access opening 27 into the wall receptacle 18 thereby securing the bracket 20 in position over and adjacent to the wall receptacle 18; d) partially screwing screws 12 into the pair of pilot holes 34 provided on a top portion of the modem side portion 28 of the bracket 20; and then, e) slidingly hanging the modem 16 on the heads of the screws 12.

A method of attaching a modem 16 to a wall 14 comprises the steps of: a) providing a wall mounting bracket 20 wherein a lower side portion of the modem attachment side portion 28 of the bracket 20 is provided with two additional pilot holes 34 as well as yet two more pairs of appropriately spaced pilot holes 36, one pair adjacent to the wall receptacles 18 for hanging the modem 16 beneath the wall receptacles 18 and the other pair 36 along the side of the modem attachment side portion 28 furthest from the wall receptacles 18 for hanging the modem 16 above the wall receptacle when the modem attachment side portion 28 of the bracket 20 is on the opposite lateral side of the receptacle 18; b) rotating the wall bracket 20 to position the modem attachment side portion 28 thereof appropriately according to available space adjacent to the particular wall receptacles 18; c) positioning the receptacle access opening 27 in the wall bracket 20 directly over a wall receptacle 18; d) plugging the six outlet adaptor 17 through the access opening 27 into the wall receptacle 18 thereby securing the bracket 20 in position over and adjacent to the wall receptacle 18; e) partially screwing screws 12 into the pair of pilot holes 34 provided on a top portion of the modem side portion 28 of the bracket 20; and then, f) slidingly hanging the modem 16 on the heads of the screws 12.

While the invention has been described with preferred specific embodiments thereof, it will be understood that this description is intended to illustrate and not to limit the scope of the invention, which is defined by the following claims.

I claim:

1. A wall mounting bracket to carry a modem adjacent to two 120 VAC outlet wall receptacles on the face of a wall, said bracket adapted to be wholly secured, and non-rotatable on the wall because of its configuration and position beneath a six outlet plug adaptor when the adaptor is plugged into the receptacles, comprising:
   a generally planar member having,
   a) a wall outlet attachment side portion which has a border portion which surrounds the six outlet plug adaptor when it is plugged into the receptacle to thereby prevent rotation with respect to the adaptor, and a flange means which extends inwardly from the border portion beneath the plug adaptor to thereby maintain the bracket adjacent to the wall, and a receptacle access opening positioned centrally within the border portion to permit electrical access to the receptacles; and,
   b) an adjacent modem attachment side portion which extends from the border portion, along the wall so that the modem can be carried thereby,
   so that the wall mounting bracket, as configured for the purpose, can be positioned and maintained on the wall wholly by the six outlet plug adaptor, and is secured on the wall, not by any attachment to the electrical box, but wholly by attachment to the 120 VAC outlet wall receptacles.

2. A wall mounting bracket as in claim 1 wherein the wall attachment bracket is fabricated from a generally rectangular sheet and comprises a) a wall side portion, which is immediately adjacent to the wall, and which comprises the flange means which is a continuous flange having a minimal depth so that it can extend beneath the six outlet adaptor when it is plugged into the receptacles, said continuous flange surrounding a first opening which permits electrical access to the receptacles, and b) a front side portion having a larger, generally rectangular, opening therethrough dimensioned to closely surround the six outlet adaptor when it is plugged into the receptacles, to thereby prevent rotation of the attachment bracket with respect to the adaptor.

3. A wall mounting bracket as in claim 2 wherein the modem is of the type having inverted keyhole slots on a rear top side portion thereof to permit carriage on the head of a screw, slidingly received in the slots, and wherein a top side portion of the modem attachment side portion of the bracket is provided with two pilot holes appropriately spaced, so that after screws are partially turned therein, the heads of the screws are received within a round portion of the keyhole slot, and the modem may slide down therein, securing attachment on the bracket.

4. A wall mounting bracket as in claim 3 wherein a lower side portion of the modem attachment side portion of the bracket is provided with two additional pilot holes appropriately spaced so that when the bracket is rotated 180 degrees about the receptacles, and the modem attachment side portion of the bracket is on the opposite lateral side of the receptacle, after screws are partially turned into the two additional holes, a top side portion of the modem can hang from screws in the two additional holes on the opposite lateral side of the receptacle.

5. A wall mounting bracket as in claim 2 wherein the first opening therethrough to permit electrical access to the receptacles is generally rectangular, and wherein the bracket further comprises a second generally rectangular electrical access opening rotated 90 degrees from the first rectangular access opening so that the receptacles may be accessed when the bracket is rotated 90 degrees either clockwise, or counter clockwise to thereby position the modem attachment side portion of the bracket respectively, either below or above the wall receptacles, as determined by available space adjacent to the particular wall receptacles.

6. A wall mounting bracket as in claim 5 wherein the modem attachment side portion of the bracket is provided with yet two more pairs of appropriately spaced pilot holes, one pair of holes beneath and adjacent to the wall receptacles for hanging the modem beneath the wall receptacles, and the other pair of holes above and adjacent to the wall receptacles for hanging the modem above the wall receptacle when the modem attachment side portion of the bracket is above the receptacle, so that after screws are partially turned into one of the two pairs of additional holes, a top side portion of the modem can hang from those screws, alternatively either beneath or above the wall receptacles.

7. A wall mounting bracket as in claim 2 further comprising a telescoping leg having an upper end portion attached to the bracket and a lower portion which can be extended downwardly to the floor to thereby prevent the bracket from twisting under the sustained weight of the modem.

8. A wall mounting bracket as in claim 2 further comprising pairs of vertically aligned small holes positioned above and below the rectangular openings in the wall side portion to permit of the screwed attachment of the wall mounting bracket to an enlarged, generally rectangular type of wall receptacle.

9. A wall mounting bracket as in claim 2 further comprising mounting bracket cover attachment means to facilitate holding a cover which largely covers the wall attachment bracket, the six outlet adapter, a modem attached thereto, as well as accompanying wires.

10. A wall mounting bracket as in claim 8 wherein the cover attachment means comprises a peripheral groove extending around the wall attachment bracket.

11. A method of attaching a modem to a wall comprises the steps of:
   a) providing a wall mounting bracket as specified in claim 6;
   b) rotating the wall bracket to position the modem attachment side portion thereof according to available space adjacent to the particular wall receptacles;
   c) positioning the receptacle access opening in the wall bracket directly over a wall receptacle;
   d) plugging the six outlet adaptor through the access opening into the wall receptacle thereby securing the bracket in position over and adjacent to the wall receptacle;
   e) partially screwing screws into the pair of pilot holes provided on a top portion of the modem side portion of the bracket; and then,
   f) slidingly hanging the modem on the heads of the screws.

12. A wall mounting bracket as in claim 1 wherein the six outlet plug adaptor has a central hole therethrough for the reception of a central security screw to ensure locking attachment to the wall receptacle, and wherein said central security screw is employed to better secure the six outlet plug to the wall receptacle thereby better securing the wall attachment bracket, having its flange means, which extends inwardly from the border portion beneath the six outlet plug adaptor, more tightly held by the tension in the central security screw.

13. A method of attaching a modem to a wall on a wall mounting bracket which is secured to the wall wholly by a six plug outlet adaptor comprises the steps of:
   a) providing a wall mounting bracket as specified in claim 12;
   b) positioning the receptacle access opening in the wall bracket directly over a wall receptacle;
   c) plugging the six outlet adaptor through the access opening into the wall receptacle thereby securing the bracket in position over and adjacent to the wall receptacle;
   d) inserting the central security screw within the central hole through the six outlet plug adaptor and tightening the screw to ensure locking attachment of the wall mounting bracket to the wall receptacle; and then,
   e) attaching the modem to the modem attachment side portion.

\* \* \* \* \*